2,963,361
SEPARATION OF URANIUM FROM ZIRCONIUM-URANIUM ALLOY

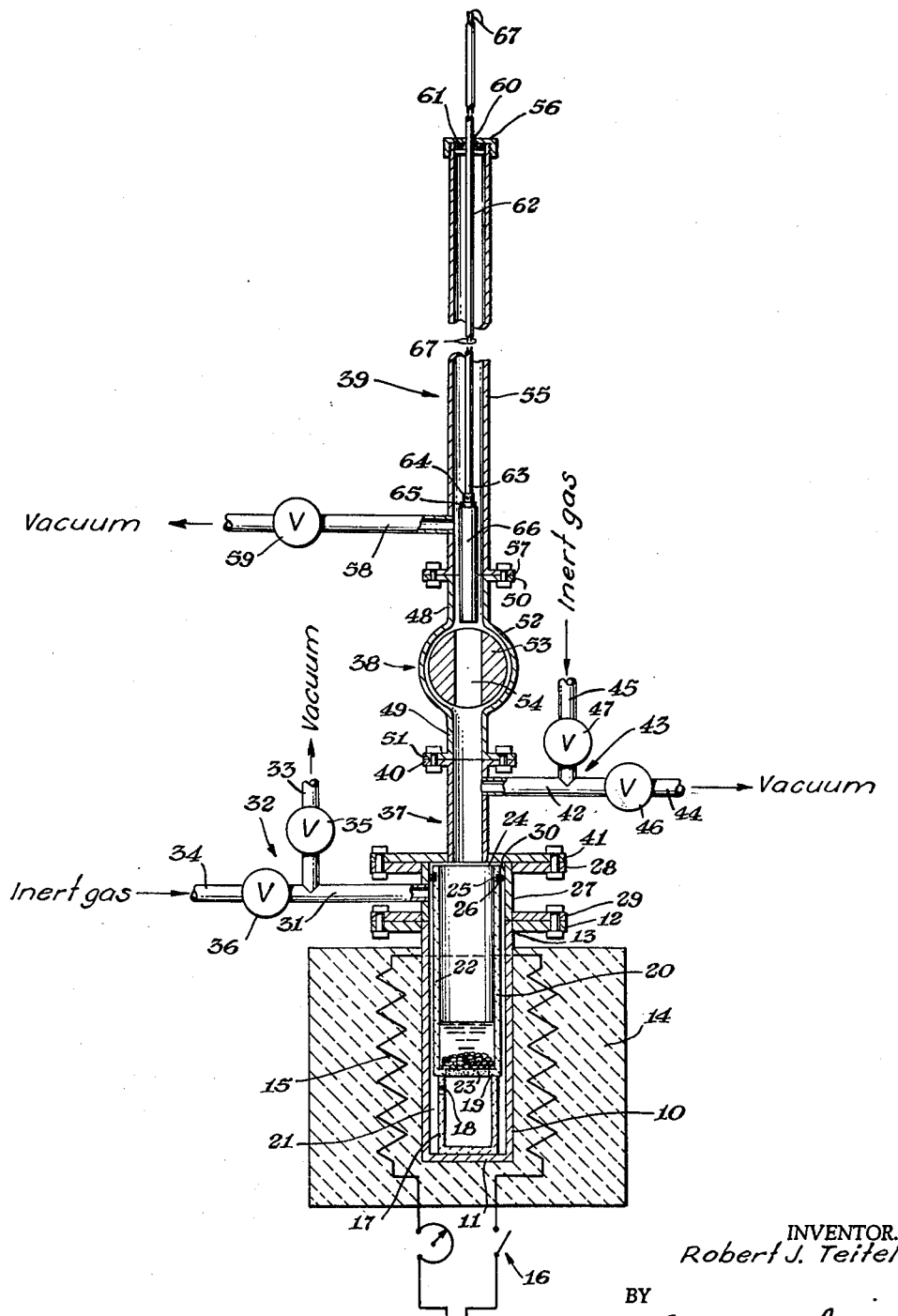

Robert J. Teitel, Midland, Mich., assignor to The Dow Chemical Company, Midland, Mich., a corporation of Delaware Filed Aug. 26, 1958, Ser. No. 757,418

3 Claims. (Cl. 75—84.1)

This invention relates to a method of separating uranium from zirconium-uranium alloy and more particularly relates to a pyrometallurgical method of extracting uranium from a zirconium-uranium alloy.

Nuclear reactor fuel elements employed currently in reactors designed for operation at elevated temperatures are frequently formed of a zirconium-uranium alloy. When a fuel element is used and becomes spent and contaminated with fission products it becomes desirable to process it and recover decontaminated useful nuclear fuel. Aqueous methods used heretofore for processing fuel elements have a number of disadvantages, such as numerous steps and large plant investments. An initial pyrometallurgical separation of uranium and zirconium would overcome some of the disadvantages and simplify subsequent aqueous processing. In addition, a pyrometallurgical method of separating uranium from zirconium-uranium alloy in which uranium is recovered as a uranium-aluminum alloy is ideally suited as a pretreatment which makes possible further pyrometallurgical processing of uranium according to my copending application Serial No. 757,419, filed August 26, 1958, now abandoned, in which is described the separation of uranium from uranium-aluminum compositions either as an intermetallic compound with aluminum or as uranium metal.

It is accordingly an object of this invention to provide a method of recovering uranium from zirconium-uranium alloy as a uranium-aluminum alloy suitable for further pyrometallurgical processing.

It is another object of the invention to provide a physical method for the separation of uranium from zirconium-uranium alloy thereby retaining uranium in the form of metal.

It is a still further object of the invention to provide a pyrometallurgical method of recovering uranium values from zirconium-uranium alloy.

Other objects and advantages of the invention will become apparent as the description proceeds.

The invention is predicated on the discovery that upon contacting a zirconium-uranium alloy with molten aluminum metal at a temperature in the range of about 660 to 1000° C. the aluminum metal corrodes the said alloy, an intermetallic compound of zirconium and aluminum is precipitated, and a melt of uranium metal dissolved in aluminum metal is formed. Upon separating the so formed melt from the said precipitate, uranium is separated from the zirconium-uranium alloy in metallic form as a uranium-aluminum alloy.

In the single figure of the appended drawing is shown one type of furnace suitably equipped for carrying out the invention and designed for the filtration of fused metals at elevated temperatures. Furnaces equipped for other separation methods such as gravitational or centrifugal settling may be used. Equipment adapted to countercurrent decantation techniques at elevated temperatures is also suitable. The furnace shown comprises a hollow cylindrical heating chamber 10 preferably of metallic construction, having a closed bottom 11 and an integrally formed radially outwardly extending flange 12 at the open top 13 thereof. The heating chamber is mounted in heating means comprising an insulated body 14 containing electrical resistance heating elements 15 connected to a source of electrical power and having therefor suitable controlling means 16. A lower hollow cylindrical crucible, or liner 17 formed of suitable material such as non-porous graphite is disposed in upright position within and resting on the bottom 11 of the heating chamber. A hole 18 is formed through the sidewall of the lower crucible adjacent the open top 19 thereof to permit gases to flow in and out of the crucible. An upper hollow cylindrical crucible 20, or liner, is mounted in upright position telescoped within the heating chamber 10 and resting upon the top 19 of the lower crucible 17. The outside diameters of crucibles 17 and 20 are both sufficiently smaller than the inside diameter of heating chamber 10 so that an annular space 21 is defined therebetween. The sidewall 22 of the upper crucible is preferably of non-porous graphite construction to avoid contamination of molten metals in contact therewith. The bottom of the upper crucible is closed by a porous graphite disc 23 press fitted transversely across the lower end of the crucible. A disc, such as one ¼ to ⅜ inch thick and of a porosity corresponding to 50 to 60 grade graphite frit as supplied by the National Carbon Co., is suitable. Adjacent the top 24 of the upper crucible in the portion extending above the heating chamber 10 is formed an annular peripheral groove 25 in which is seated an O-ring 26 of elastic material. Surrounding the same portion of the upper crucible 20 which extends above the heating chamber 10 is a vertical hollow cylindrical section 27 having a radially outwardly extending flange 28 formed at the upper end thereof and a similar flange 29 formed at the lower end. The lower flange 29 mates with and is mechanically coupled to the flange 12 of the heating chamber to form a gas-tight connection. O-ring 26 slideably engages the interior wall 30 of cylindrical section 27 whereby a gas-tight seal is formed therebetween. A pipe 31 provides a gas connection between the sidewall of cylindrical section 27 below the O-ring seal 26 and a pipe T 32 one branch 33 of which is connected to a vacuum pump not shown and the other branch 34 to a source of inert gas not shown through valves 35 and 36, respectively.

Mounted above cylindrical section 27 are means for introducing materials into the furnace and means for controlling the atmosphere above the furnace charge within upper crucible 20. As shown these means comprise in vertical relationship a tubular section 37, a valve section 38 and a gas lock 39.

Tubular section 37 is provided with upper and lower flanges 40 and 41 respectively. Flange 41 is mated with and mechanically coupled to flange 28 of the cylindrical section 27. A pipe 42 provides a gas connection between the sidewall of tubular section 37 and a pipe T 43, one branch 44 of which is connected to a vacuum pump not shown and the other branch 45 to a source of inert gas not shown through valves 46 and 47 respectively.

Valve section 38 is provided with upper and lower tubular extensions 48 and 49 terminating in radially outwardly extending flanges 50 and 51, respectively, and a full-flow valve 52, such as that shown in the drawing, having a rotatable plug 53 with a bore 54 therethrough, the diameter of the bore being approximately as large as the inner diameter of tubular section 37. Other types of full flow valves such as a gate valve may also be used. Flange 50 is mounted on and sealed against flange 40 of tubular section 37.

Gas lock 39 comprises a tubular section 55 threadably closed by a cap 56 at the upper end and having a radially outwardly extending flange 57 at the lower end thereof mounted on and sealed against flange 50 of valve section 38. Pipe 58 provides a gas connection between the sidewall of the gas lock and vacuum pump means not shown through valve 59. Cap 56, having an opening 60 formed therethrough, is equipped with a packing gland 61 formed of suitable elastic material which allows slidable movement of a metal probe 62 through the opening while maintaining a reduced pressure atmosphere inside the gas lock.

Probe 62 comprises an elongated hollow metal tube, for example of stainless steel construction, sufficiently long to extend from above cap 56 downwardly to about the lower end of upper crucible 20. Probe 62 is closed at the lower end 63 and has an integrally formed lower extension 64 of solid rod. The extension 64 is externally threaded so as to be adapted to threadably engage further extensions internally bored and tapped. Further extensions may include a graphite adapter 65 which in turn threadably engages an aluminum metal bar or rod 66 which is to be added to the furnace charge. The graphite adapter 65 permits entirely immersing the metal bar 66 in a molten furnace charge without exposing steel parts of probe 62 thereto. Temperatures inside the furnace assembly are sensed by a thermocouple junction inserted in probe 62 to the lower end 63 thereof. Leads 67 from the junction are connected to a suitable device, not shown, for measuring electromotive force.

When intensely radioactive zirconium-uranium alloy is processed, the furnace used must be provided with suitable radiation shielding to protect the operator.

In carrying out the invention a zirconium-uranium alloy is sheared, forged, or melted and cast if necessary, into a form having at least one dimension not exceeding ½ inch, and preferably not exceeding ⅛ inch, in order to avoid long heating at elevated temperatures during the corrosion step. These pieces are further reduced or sheared, if necessary, into pieces readily admitted by the furnace heating chamber.

The zirconium-uranium alloy pieces are cleaned and degreased, if necessary, and charged to a crucible or suitably lined chamber within the furnace. According to a preferred embodiment of the invention, reference being had to the drawing, the furnace is opened by disconnecting and separating flanges 28 and 41, and the charge is placed directly in upper crucible 20.

An amount of aluminum metal preferably equal to from one to ten times the total weight of zirconium-uranium alloy pieces, though more aluminum may be used if desired, is placed in the same crucible.

The atmosphere of the interior of the furnace is made inert as by evacuating the furnace or as by evacuating and refilling the furnace with an inert gas, if desired. It is essential however in the operation of a furnace of the filtration type to control the pressure differential across the filter, for example, filter disc 23 in upper crucible 20 as shown in the drawing, to prevent untimely filtration of molten metal during the initial fusion step hereinafter described. For small charges of molten metal, filtration is usually prevented upon maintaining equal gas pressures above and below the filter. For larger charges of molten metal it is often necessary to maintain a greater gas pressure below the filter, the differential being about equivalent to the fluid head above the filter.

It is also possible to protect the charge with a flux cover making an inert atmosphere unnecessary.

Heating is started as by turning on the electrical resistance heating elements 15 and the furnace charge is heated to a temperature in the range of 660 to 1000° C. The corroding action of molten aluminum on solid zirconium-uranium alloy is relatively slow at temperatures close to the melting point of aluminum. At higher temperatures, such as temperatures above 1000° C., aluminum tends to seriously attach graphite crucibles. Crucibles of alumina or fused magnesia, which may be used if desired in a furnace equipped for making separations by settling, are more resistant to aluminum at elevated temperatures. The preferred operating temperature during the corrosion step is in the range of 800 to 900° C.

Heating of the furnace charge is continued at the operating temperature until the action of the aluminum on the zirconium-uranium alloy is virtually or entirely complete so that most of the zirconium is converted to a precipitate of zirconium-aluminum intermetallic compound and the uranium is alloyed with molten aluminum. Zirconium is soluble in molten aluminum only to the extent of about 0.15 weight percent. Heating times for corrosion of ⅛ inch thick alloy may vary from about 30 minutes at about 900° C. to several hours at about 700° C.

After the corroding action of the aluminum is completed the temperature of the furnace charge is preferably lowered during a holding period of 30 to 120 minutes to permit precipitation of additional zirconium-aluminum intermetallic compound. A temperature above that of the solidification point of the aluminum-uranium melt is maintained during the holding period. Temperatures of 10 to 100 centigrade degrees above the melting point of pure aluminum are generally used to prevent solidification of the melt, the lower temperatures being adequate for melts containing up to about 15 percent uranium, and higher temperatures being necessary for higher uranium concentrations up to about 20 percent uranium.

After the holding period the aluminum-uranium melt or alloy is separated from precipitated zirconium-aluminum intermetallic compound. The separation may be carried out by a filtration method as described hereinbelow or it may be carried out by gravitational or centrifugal settling of the solids in the mixture, followed by solidification of the settled mixture as a casting and shearing or cutting off the zirconium-rich portion of the solidified casting.

In carrying out the filtration method the inert gas pressure in the space above the molten furnace charge above the filter, as for example the space above filter disc 23 of the drawing, is brought to about 15 to 25 pounds per square inch absolute (p.s.i.a.) while the space below the filter, as for example the interior of the lower crucible 17, is evacuated. This causes the liquid phase consisting substantially of aluminum-uranium alloy to pass through the filter and collect in a suitable container therebelow while the bulk of the zirconium is retained above the filter as zirconium-aluminum intermetallic compound.

Since the retained precipitate is not sucked dry by such a filtration but is still wet by entrained aluminum-uranium alloy the separation can be improved by washing the precipitate with molten aluminum metal.

The proportions of aluminum desirably used in a washing step are mainly determined by several factors such as the efficiency of removal of entrained aluminum-uranium alloy in the previous separation step, the limits of uranium dilution tolerated by the intended use of the aluminum-uranium alloy formed in the washing process, and the efficiency of the washing techniques used. While amounts of aluminum equal to from about one to four times the weight of the zirconium values in the precipitate so treated are generally effective in washing out entrained aluminum-uranium alloy, more aluminum may be used if desired.

The washing step is carried out as follows. The space below the filter is repressurized to about 12 p.s.i.a. with an inert gas and the inert gas pressure above the filter is reduced to 12 p.s.i.a. or lower. By means of a probe aluminum in bar or rod form is lowered into the upper crucible containing the impure zirconium-aluminum precipitate. The furnace is heated and the charge brought to and maintained at a temperature of a least 660° C. for a sufficient time to fuse the added metal and permit alloying of the so fused metal and aluminum-uranium alloy entrained with the previously precipitated zirconium-aluminum intermetallic compound. The washing cycle is completed by applying 15 to 25 p.s.i.a. inert gas pressure above the furnace charge above the filter while simultaneously evacuating the space below the filter, thus drawing the melt containing uranium and aluminum through the filter and leaving zirconium-aluminum intermetallic compound above the filter. If desired, the washing cycle may be repeated one or more times, a number of smaller washes being more efficient in total than one large wash with an equivalent amount of aluminum.

The zirconium-rich portion of a solidified casting obtained in carrying out the separation of zirconium-aluminum compound and aluminum-uranium alloy by settling may also be treated with additional molten aluminum to effect removal of aluminum-uranium alloy entrained with precipitated zirconium-aluminum intermetallic compound in a similar manner adapted to the settling method of separation.

The action of aluminum on zirconium-uranium alloy is not completely understood. It is believed that the mode of attack by molten aluminum is formation of the intermetallic compound $ZrAl_3$ which crystallizes in a larger or different crystal lattice than that of the zirconium-uranium alloy. A result of the lattice expansion is exfoliation of $ZrAl_3$ from the alloy surface thus exposing additional zirconium-uranium alloy to attack. Exposed uranium is readily taken up by aluminum present in excess of that required for combination with zirconium.

The stoichiometrical proportion of aluminum needed for the precipitation of zirconium as $ZrAl_3$ is 89 grams of aluminum per 100 grams of zirconium. As the corrosion of zirconium-uranium alloy proceeds, only the aluminum present in proportions greater than about 89 percent of the zirconium content of the portion disintegrated by corrosion is available for dissolution of exposed uranium. The solubility of uranium in pure aluminum varies from about 13 weight percent at 650° C. to about 28 weight percent at 900° C. (based on data listed on p. 752 of The Reactor Handbook, volume 2, Engineering, AECD-3646, Technical Information Service, U.S. Atomic Energy Commisison, May 1955). From the above available information minimum aluminum requirements can be calculated as follows for a given zirconium-uranium alloy composition and a given operating temperature.

For a zirconium-uranium alloy containing 2 weight percent of uranium, 89 percent of (100−2)=87 grams aluminum required per 100 grams of the alloy to precipitate zirconium as $ZrAl_3$. At an operating temperature of 700° C. the solubility of uranium in aluminum is about 17 weight percent. The theoretical minimum requirement of aluminum to prepare a saturated solution of $$2 \text{ grams of uranium in aluminum} = \frac{2}{0.17} - 2$$

or about 9.8, grams of aluminum. The total theoretical minimum amount of aluminum required in this case is therefore 87+9.8, or 96.8, grams of aluminum per 100 grams of the above 2 percent alloy.

*Example I*

35.65 grams of a zirconium-uranium alloy consisting of 3 percent of uranium, the balance zirconium, in the form of a cast button about 2 inches in diameter and about ⅛ inch thick, and 146 grams of aluminum metal in the form of sheared sections of ⅝ inch rod each about ½ inch long, were charged to the upper or filtering crucible of a furnace equipped for filtration of molten metals at elevated temperatures. The heating chamber was evacuated and the pressurized to about 12.5 p.s.i.a. with helium gas, then heated to and maintained at a temperature of 900° C. for 2 hours and 20 minutes. The temperature of the heating chamber was then lowered to and maintained at 676° C. for 1 hour and 30 minutes. The helium gas pressure above the furnace charge was increased to 22 p.s.i.a. while the space below the filter was evacuated, causing the liquid phase to pass through the filter to the crucible positioned below the filter. Solids were retained above the filter. The furnace was allowed to cool to room temperature and disassembled. 91.9 grams of residue on the filter were recovered. The residue contained 35.7 percent of zirconium and 0.21 percent of uranium. 84.4 grams of filtrate were recovered from the lower crucible. The filtrate contained 0.98 percent of uranium, about 0.15 percent of zirconium and the balance aluminum. 82 percent of the total uranium recovered in the two fractions was found in the filtrate.

*Example II*

38 grams of a zirconium-uranium alloy consisting of 18 percent uranium, the balance zirconium in the form of a cast button about 2 inches in diameter and ⅛ inch thick, and 151 grams of aluminum metal, in the form of sheared sections of ⅝ inch rod, each about ½ inch long, were charged to the upper or filtering crucible of a furnace equipped for filtration of molten metals at elevated temperatures. The heating chamber was evacuated and then pressurized to about 12.5 p.s.i.a. with helium gas, then heated to and maintained at a temperature of 900° C. for 2 hours and 10 minutes. The temperature of the heating chamber was then lowered to and maintained at about 690° C. for 2 hours. The helium gas pressure above the furnace charge was increased to 22 p.s.i.a. while the space below the filter was being evacuated, causing the liquid phase to pass through the filter to the crucible positioned below the filter while solids and some residual entrained liquid phase were retained above the filter. The furnace was allowed to cool to room temperature. An aluminum rod ⅝ inch in diameter and about 7 inches long and weighing 152 grams was attached to an elongated probe and inserted in a gas lock attached to the top of the furnace assembly. The gas lock was evacuated and a full flow ball valve interconnecting the gas lock and the furnace assembly was opened. The aluminum metal rod was then lowered by means of the probe to the interior of the upper crucible. The entire furnace assembly above and below the filter was brought to 12.5 p.s.i.a. with helium gas and the heating chamber was heated to and maintained at about 900° C. for 1½ hours so that the aluminum metal rod fused and alloyed with residual entrained aluminum-uranium alloy. The temperature of the heating chamber was then lowered to and maintained at 685° C. for 2 hours. The helium gas pressure above the furnace charge was increased to 22 p.s.i.a. while the space below the filter was being evacuated, causing the liquid phase to pass through the filter to the crucible positioned below the filter where this filtrate was combined with the previous filtrate. Solids were retained above the filter. The furnace was allowed to cool to room temperature and disassembled. 254.2 grams of combined filtrate containing 2.67 percent of uranium, 0.17 percent of zirconium and the balance aluminum were recovered from the lower crucible. 82.4 grams of residue on the filter were recovered. The residue contained 37.1 percent of zirconium and 0.26 percent of uranium. 97 percent of the uranium recovered in the two fractions was found in the combined filtrates while 98.7 percent of the total zirconium was retained on the filter.

What is claimed is:

1. The pyrometallurgical method of extracting uranium from a zirconium-uranium alloy comprising contacting the said alloy at a temperature of about 660 to 1000° C. with an amount of molten aluminum metal at least equal to the weight of the zirconium-uranium alloy whereby uranium is dissolved in molten aluminum and zirconium is precipitated as an intermetallic compound with aluminum, and separating the so precipitated zirconium-aluminum compound from the so formed aluminum-uranium alloy.

2. The pyrometallurgical method of extracting uranium from a zirconium-uranium alloy comprising contacting the said alloy at a temperature of about 660 to 1000° C. with an amount of molten aluminum metal equal to from about one to ten times the weight of the zirconium-uranium alloy whereby uranium is dissolved in molten aluminum and zirconium is precipitated as an intermetallic compound with aluminum, separating the so precipitated zirconium-aluminum compound from the so formed aluminum-uranium alloy, at least once contacting the separated precipitated zirconium-aluminum compound with an additional portion of molten aluminum metal at a temperature in the range of about 660 to 1000° C. whereby aluminum-uranium alloy entrained by the separated precipitate is taken up in the additional aluminum metal, and separating the so treated precipitate from the so diluted aluminum-uranium alloy.

3. The pyrometallurgical method of extracting uranium from a zirconium-uranium alloy comprising contacting the said alloy at a temperature of about 660 to 1000° C. with an amount of molten aluminum metal equal to from about one to ten times the weight of the zirconium-uranium alloy whereby uranium is dissolved in molten aluminum and zirconium is precipitated as an intermetallic compound with aluminum separating the so precipitated zirconium-aluminum compound from the so formed aluminum-uranium alloy, and repeatedly washing the separated zirconium-aluminum compound with portions of additional molten aluminum metal, the portions collectively comprising a total amount of aluminum metal equal to from about one to ten times the weight of the said zirconium-uranium alloy, and recovering the aluminum metal washings.

References Cited in the file of this patent

Metals Handbook, 1948 edition, page 1168, published by American Society for Metals.

Report of Investigations 5007, published by Bureau of Mines, November 1953, page 17.

The Reactor Handbook, vol. 2, page 752, Engineering, AECD–3646, U.S. Atomic Energy Commission, May 1955.